March 24, 1959     R. L. ESKEN     2,878,573
GAUGING DEVICE
Filed Nov. 23, 1955     3 Sheets-Sheet 1
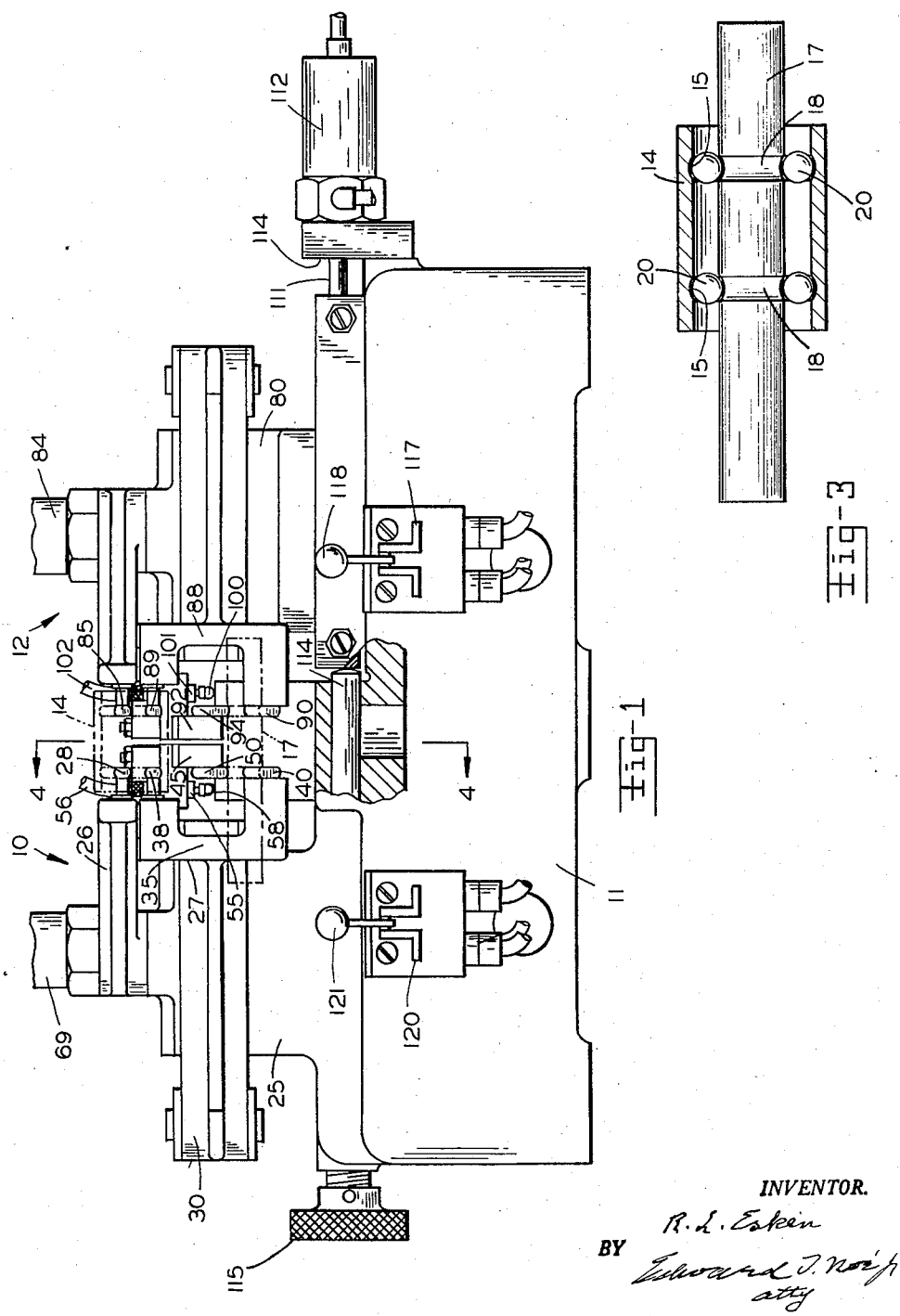
INVENTOR.
R. L. Esken
BY

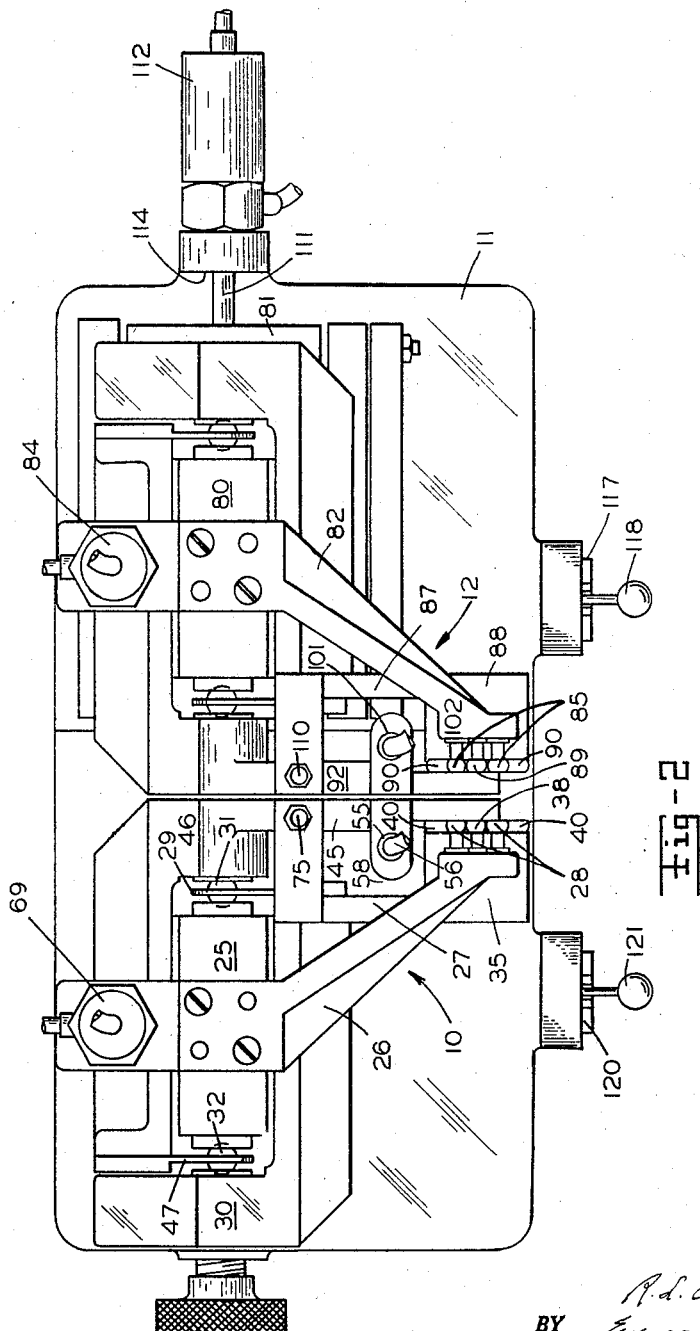

March 24, 1959  R. L. ESKEN  2,878,573
GAUGING DEVICE

Filed Nov. 23, 1955  3 Sheets-Sheet 3

INVENTOR.
R. L. Esken
BY

United States Patent Office 2,878,573
Patented Mar. 24, 1959

2,878,573

GAUGING DEVICE

Robert L. Esken, Dayton, Ohio, assignor, by mesne assignments, to The Sheffield Corporation, a corporation of Delaware Application November 23, 1955, Serial No. 548,617

6 Claims. (Cl. 33—174)

The present invention relates to gaging apparatus and more particularly to an apparatus for comparing cooperating dimensions.

It is an object of this invention to provide an apparatus for comparing dimensions on a pair of cooperating parts, the raceways of cooperating ball bearing parts for example, wherein one part is automatically positioned in accordance with the cooperating dimension of the other part and gaging means engaging the positioned part is responsive to the relationship between the parts.

It is a further object to provide an apparatus to gage the dimensional relationship between cooperating surfaces on a pair of parts, such as the relatively fixed inner raceways and relatively fixed outer raceways of a bearing, wherein the size of anti-friction elements is determined for proper assembly between the surfaces not only in accordance with dimensions of the cooperating surfaces but also by the difference in axial spacing between the surfaces on each part.

It is a further object to provide an apparatus for gaging the ball size for assembly with a pair of relatively fixed inner raceways and a pair of relatively fixed outer raceways wherein a pair of gaging assemblies each having gaging contacts cooperating between one pair of cooperating raceways are movable along the axes of the parts to carry the gaging contacts into association with the raceways, provision being made for further adjustment during gaging to properly seat the contacts to obtain a gaging response indicative of the optimum ball size for assembly and determined by the raceway dimensions and the difference in axial spacing between the raceways.

Figure 4:
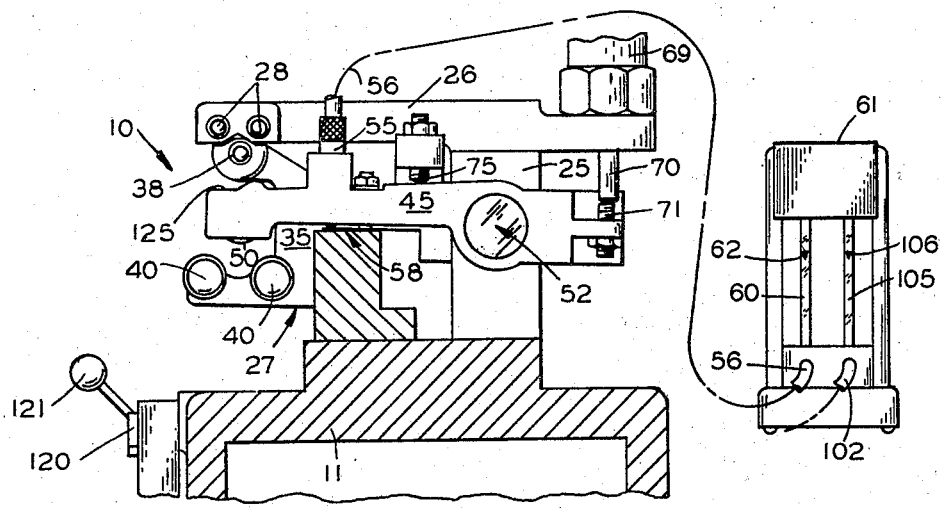
Figure 6:
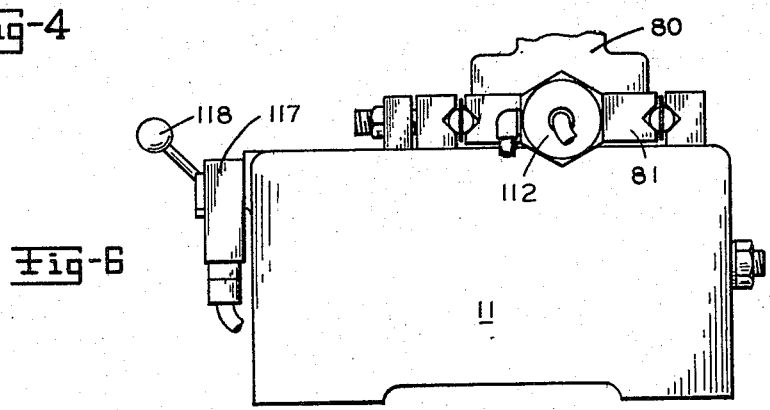
Figure 5:
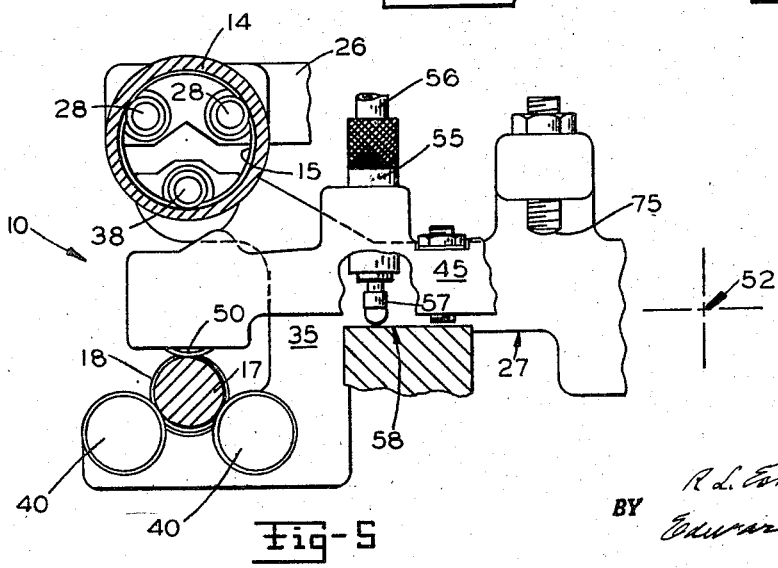

Other objects and advantages of the invention will be apparent from the following description, the appended claims, and the accompanying drawings, in which, Figure 1 is a front elevational view of an apparatus embodying the present invention with a portion of the apparatus broken away, Figure 2 is a plan view of the apparatus, Figure 3 illustrates an exemplary assembly gaged with the apparatus of the present invention, Figure 4 is a sectional view taken on line 4—4 of Figure 1, Figure 5 is an enlarged fragment of Figure 4 showing one gaging assembly in gaging position, and Figure 6 is a fragmentary view of the right hand end of the apparatus.

The apparatus of the present invention is provided for comparing dimensions of cooperating parts and has particular application in gaging the relative dimensions of bearing raceways to determine the optimum ball size for assembly therewith. For that reason it has been illustrated and will now be described in such an application.

In comparing one cooperating pair of raceways, a first raceway is engaged at one side and located in a fixed position relative to the apparatus base. A positioning member engages the other side of this raceway is thus positioned in accordance with the raceway diameter. The member carries locating contacts which engage one side of the second raceway, locating this raceway relative to the base in accordance with the dimension of the first raceway. Accordingly a gaging contact engaging the opposite side of the second raceway will be positioned relative to the base in accordance with the relative diameters of the raceways to control a gaging means. This provides an extremely compact and simple assembly for comparing such dimensions.

In an assembly such as a pump shaft and a cooperating supporting sleeve having a pair of relatively fixed inner raceways on the shaft and a pair of relatively fixed outer raceways in a passage through the sleeve, the gaging of the optimum ball size for assembly therewith is complicated not only by the fact that the outer raceways are relatively inaccessible within the sleeve but also because the ball size is determined not only by the raceway dimensions but by the difference in axial spacing between the pair of raceways on each part. Through the present invention a pair of gaging assemblies are provided for relative movement along the axis of supported parts to be gaged. Each assembly has raceway engaging contacts in a common plane. Those contacts provided for association with the outer raceways project towards one another sufficiently to enter the passage through the sleeve whereby all contacts are easily moved into association with the raceways for gaging. The apparatus is expanded to allow loading of the outer raceway and the assemblies are moved toward one another into gaging position.

An adjustment is provided to refine the relative location of the assemblies until the contacts are properly seated in the raceway pairs as balls would seat in the assembly. By relatively adjusting the gaging assemblies it can be determined from the indications obtained when the contacts are properly seated, what the optimum ball size is. The gaging results obtained are determined by the dimensions of the raceways and the difference in axial spacing between the raceways on each part.

Figure 3 illustrates a pump shaft and sleeve assembly which is gaged in this particular application of the apparatus. The sleeve 14 has a pair of outer raceways 15 adjacent the ends of the sleeve passage. The pump shaft 17 includes a pair of inner raceways 18. Balls 20 cooperate between the raceway pairs to support the parts for relative rotation. For efficient operation it is necessary that a shaft 17 and sleeve 14 be assembled with the optimum size balls 20. This optimum ball size will be determined not only by the dimensions of the raceways but also by the difference in axial spacing between the inner raceways 18 and the outer raceways 15.

The apparatus includes a first gaging assembly 10 mounted in a fixed position on base 11 and a second gaging assembly 12 slidable along the base toward and from assembly 10.

Gaging assembly 10 is typical of the two assemblies of the apparatus and is shown particularly in Figures 4 and 5. A pedestal 25 extends upward from base 11 and supports the assembly at the left-hand end of the base. An arm 26 fixed to the upper surface of the pedestal supports a pair of locating contacts 28 at its forward end for engagement with one side of an outer raceway 15 to locate the race relative to the base. A positioning member or arm 27 has rearward supports 29 and 30 which respectively cooperate with balls 31 and 32 in a conventional manner to support the arm for swinging movement on pedestal 25. The forward end of arm 27 is formed as a yoke 35 having a contact 38 on its upper portion and carrying locating contacts 40 on its lower portion. When arm 27 pivots downwardly contact 38 engages raceway 15 at a point opposite fixed contacts 28 and the arm 27 and locating contacts 40 are positioned relative to base 11 in accordance with the diameter of raceway 15. Inner raceway 18 on shaft 17 is engaged at one side by contacts 40 and its position is thus determined by the diameter of outer raceway 15.

A gaging arm 45 is pivoted coaxially with arm 27 on an axis 52 by supports 46 and 47 also carried by balls 31 and 32. Arm 45 has a contact 50 at its forward end for engagement with inner raceway 18 at a point substantially opposite contacts 40.

Arm 45, with contact 50 engaging raceway 18 in opposition to locating contacts 40 will thus be positioned relative to base 11 in accordance with the relationship between the diameters of this cooperating pair of raceways. Gaging means cooperate between arm 45 and base 11. As illustrated an air leakage gaging cartridge 55 is carried by arm 45. This cartridge can be of the type illustrated and described more specifically in Patent No. 2,691,827 issued October 19, 1954. Such cartridges include an orifice controlled by movements of a contactor 57 slidable within the cartridge. A fixed surface 58 on base 11 opposes contactor 57 to control the fluid leakage in accordance with the relative dimensions between the contacted raceways. Cartridge 55 is connected by conduit 56 to one column 60 of an air flow type gaging unit 61. In such instruments air flow upward through an internally tapered transparent flow tube is controlled by the leakage escaping through the orifice of cartridge 55 and an indicating float 62 is positioned along column 60 in accordance with the gaged relationship.

An air operated mechanism is provided to raise the movable arms to release the parts and lower the contacts into engagement with the parts for gaging. A piston within an air cylinder 69 at the rear end of arm 26 serves to project and retract a rod 70 in opposition to an adjustable stop 71 at the rear end of arm 45. Between its ends arm 27 carries an adjustable stop 75 in opposition to the upper surface of actuated arm 45. Thus when rod 70 is projected arm 45 is rotated clock-wise as viewed in Figures 4 and 5 to first raise contact 50. After a predetermined amount of upward movement arm 45 engages stop 75 on arm 27, raising contact 38 from engagement with outer raceway 15. Engagement of the upper portion of yoke 35 with the outer end of arm 26 determines the upward positions of the pivoted arms.

Thus it will be seen that an extremely compact assembly has been provided for gaging the interrelationship between a cooperating pair of raceways.

The right-hand assembly 12 is supported on a pedestal 80 carried by ball slide 81 movable on base 11. Arm 82 fixed to pedestal 80 carries actuating cylinder 84 for raising and lowering the arms of this assembly and fixedly mounts locating contacts 85 at its forward end. Positioning arm 87 carries yoke 88 mounting upper contact 89 for engagement with the outer raceway and locating contacts 90 for supporting engagement with the inner raceway of shaft 17. The gaging arm 92 pivotally carries contact 94 for engagement with the upper surface of the inner raceway at the right-hand end of shaft 17. The work contactor 100 of a gaging cartridge 101 controls the flow through a tube 102 connected to column 105 of instrument 61. Float 106 is positioned in accordance with the dimensional relationship between the inner and outer raceways at the right-hand end of shaft 17 and sleeve 14 respectively. Arm 87 has an adjustable stop 110 which is engaged by arm 92 when the arm is raised by cylinder 84.

Slide 81 is connected by means of a rod 111 to piston within a cylinder 112. The inward movement of the slide is limited by an adjustable stop 113 positioned by rotation of a knob 115 at the left-hand end of the apparatus. The retracted position is limited by stop 114 at the right-hand end of the apparatus as seen in Figure 2. With slide 81 retracted to the right expanding the various contacts and with the arms in both assemblies rocked upward to positions as shown for the arms of assembly 10 in Figure 4 the apparatus is prepared for loading. A conventional air valve 117 controlled by a lever 118 controls the movement of slide 81. A similar valve 120 controlled by lever 121 controls the simultaneous movement of the pistons within cylinders 69 and 84 at the rear of the apparatus. The air circuits are omitted for simplicity.

The forward ends of gaging arms 45 and 92 have locating surfaces as indicated at 125 in Figure 4 for the arm 45. With the slides relatively expanded these surfaces cooperate to support sleeve 14.

The first step in a gaging operation is to place the sleeve 14 on the supporting surfaces at the outer ends of arms 45 and 92. When lever 118 is pivoted slide 81 moves in against stop 114 and the contacts for gaging the outer raceways are carried within the sleeve passage. Shaft 17 is then placed in association with the sets of contacts for gaging the inner raceways. At this point lever 121 is pivoted to actuate valve 120 controlling cylinders 69 and 84 to release the gaging arms, thus bringing the various contacts into association with the raceways. Knob 115 controls the relative positions of the assemblies and is used in conjunction with indicator 61 to ascertain when the contacts are properly seated in the raceway pairs and when the optimum ball size is indicated. Floats 62 and 106 will have their lowest position in tubes 60 and 105 at the lowest rates of flow where the movable contacts are seated the furthest into the respective raceways simulating the ball positions in the assembly.

During gaging the operator first rotates knob 115 to move slide 81 against the pressure maintained in cylinder 112, causing the contacts to ride up in the raceways and positioning floats 60 and 106 high in the tubes. The raceways of sleeve 14 and shaft 17 tend to relatively centralize themselves through the engagement of the gaging and locating contacts with the raceways. Knob 115 is rotated in the opposite direction to move assembly 12 to the left and obtain the lowest float position when the contacts are as far as possible into the raceways and an indication of the optimum ball size. Differences in float position are averaged out.

After gaging lever 121 is actuated to raise the pivotally mounted arms and shaft 17 can be removed from the apparatus. Then the right-hand lever 118 is moved to retract slide 81 and the sleeve 14 is removed.

Thus it is seen that a simple and compact gaging apparatus has been provided for comparing cooperating dimensions on a pair of cooperating parts. Provision has been made for using a pair of gaging assemblies for determining the optimum ball size for assembly with cooperating bearing components having relatively fixed inner raceways and relatively fixed outer raceways. By means of the adjustments provided and the unique interrelationship of the components of the apparatus variations in axial spacing between the raceways and the dimensions of the raceways themselves are automatically interrelated in the apparatus to indicate the proper ball size for the spaces available between the raceways.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gaging apparatus for comparing the diameters of cooperating inner and outer raceways of a bearing, comprising a base, a pair of locating contacts fixedly mounted on said base for engaging the outer raceway and supporting it as by hanging, a positioning member carried for pivoting movement about an axis fixed on said base, said member having a contact for engagement with the outer raceway at a point substantially equidistant from said locating contacts, whereby said positioning member is located in accordance with the diameter of the outer raceway, a pair of locating contacts fixed on said member for engagement with the inner raceway to support and locate the raceway with respect to the base, whereby the disposition of the innerraceway with respect to the base is determined by the diameter of the outer raceway, a gaging member carried coaxially with said first member and having a contact for engagement with the inner raceway at a point substantially equidistant from the member carried locating contacts, whereby said gaging member is positioned relative to said base in accordance with the relationship between the diameters of the inner and outer raceways, and gaging means cooperating between said gaging member and said base.

2. Gaging apparatus for simultaneously gaging the dimensional relationship between a pair of relatively fixed inner raceways and a pair of relatively fixed outer raceways on cooperating parts of an anti-friction bearing assembly, comprising a base, a pair of gaging assemblies on said base, each assembly comprising contact means for engaging an inner and an outer raceway of a cooperating pair, means supporting the parts in parallel relationship, means mounting said assemblies on said base for relative movement along the axes of the supported raceways, adjustment means for adjusting the relative positions of the assemblies during gaging to accommodate the axial displacement between the raceways and simultaneously gage the dimensional relationship between the respective raceway pairs, and gaging means responsive to the dimensional relationship between the engaged raceways.

3. An apparatus for gaging the optimum size anti-friction elements for assembly between a pair of relatively fixed inner raceways on an inner unit and a pair of relatively fixed outer raceways in a passage through a cooperating outer unit, comprising a base, a pair of gaging assemblies on said base cooperating to support said units in parallel relationship for gaging, each assembly comprising contacts for engaging an inner and outer raceway of a cooperating pair and gaging means responsive to the dimensional relationship between the engaged raceways, the contacts for engaging the outer raceway projecting toward one another for entry into the outer unit passage, means mounting said assemblies on said base for relative movement parallel to the axis of the supported units, and means for adjusting the relative positions of the assemblies during the gaging to gage the optimum ball size for assembly with the units.

4. An apparatus for gaging the optimum ball size for assembly with the cooperating pairs of raceways of an assembly including a pair of relatively fixed inner raceways on an inner part and a pair of relative fixed outer raceways in a passage through a cooperating outer part, comprising a base, a pair of gaging assemblies supporting said units in parallel relationship for gaging, each of said assemblies comprising a pair of locating contacts fixed relative to the base for engagement with spaced points on an outer raceway and upon which the raceway is supported as by hanging, a positioning arm in each assembly mounted for swinging movement about an axes parallel to the supported units, a contact supported by the positioning arm for movement into engagement with the respective outer raceway at a point substantially equidistant from the two locating contacts whereby the swinging movement of the arm is limited in accordance with the diameter of the outer raceway, a pair of locating contacts on the arm for engagement with the surface of the respective inner raceway whereby the inner raceway is located relative to the apparatus base in accordance with the gaged dimension of the corresponding outer raceway, a gaging arm in each assembly pivoted coaxially with the respective positioning arm and carrying a gaging contact for movement into engagement with the respective inner raceway at a point substantially equidistant to the opposing locating contacts, the raceway contacts of each assembly being carried for relative movement in a common plane and the contacts provided for outer raceway gaging projecting toward one another between the respective assemblies for entry into opposed ends of the passage through the outer unit, means mounting said assemblies on said base for relative movement along the axes of the supported units whereby the contacts are carried into association with the raceways, gaging means responsive to the disposition of each gaging arm relative to the base, indicating means operatively connected to the gaging means, and adjusting means in said apparatus for adjusting the spacing between the assemblies to obtain an indication of the optimum ball size for assembly with the parts.

5. A gaging apparatus of claim 4 wherein said gaging means comprises air leakage gaging means cooperating between the base and each respective arm.

6. The apparatus of claim 4 wherein each of the gaging arms have receiving means on their upper surfaces cooperating to receive and locate the outer unit when the assemblies are relatively expanded for loading.

References Cited in the file of this patent

UNITED STATES PATENTS

| | | |
|---|---|---|
| 1,062,566 | Golke | May 20, 1913 |
| 1,274,331 | Rockwell | July 30, 1918 |
| 1,938,216 | Damerell | Dec. 5, 1933 |
| 2,407,490 | Gregg | Sept. 10, 1946 |
| 2,675,621 | Mims | Apr. 20, 1954 |
| 2,723,461 | Reason | Nov. 15, 1955 |

OTHER REFERENCES

American Machinist, pages 383 and 384, February 27, 1930.